United States Patent [19]

Teach

[11] Patent Number: 4,786,178
[45] Date of Patent: Nov. 22, 1988

[54] APPARATUS AND METHOD FOR DETECTING THE POSITION AND ORIENTATION OF A REFERENCE BEAM OF LIGHT

[75] Inventor: Ted L. Teach, Dayton, Ohio

[73] Assignee: Spectra-Physics, Inc., San Jose, Calif.

[21] Appl. No.: 941,848

[22] Filed: Dec. 15, 1986

[51] Int. Cl.$^4$ .............................................. G01B 11/00
[52] U.S. Cl. ..................................... 356/400; 356/153
[58] Field of Search ....................... 356/153, 399, 400; 175/41, 45; 299/1

[56] References Cited

U.S. PATENT DOCUMENTS

| | | | |
|---|---|---|---|
| 3,321,248 | 5/1987 | Williamson et al. | 299/1 |
| 3,498,673 | 3/1970 | Ledray et al. | 299/1 |
| 3,817,624 | 6/1974 | Martin | 356/138 |
| 4,688,937 | 8/1987 | König et al. | 356/153 |

OTHER PUBLICATIONS

AGL Corporation, sales brochure entitled, "Total Control Laser," date unknown.
"Laser Beam Guides Tunnel Borer," Coal Age, May, 1966, p. 116.

Primary Examiner—Bruce C. Anderson
Assistant Examiner—Paul A. Guss
Attorney, Agent, or Firm—Killworth, Gottman, Hagan & Schaeff

[57] ABSTRACT

An apparatus for detecting the relative position and orientation of a reference beam of light includes first and second detectors for detecting the intersection of the reference beam with first and second spaced and substantially parallel reference planes. The measured horizontal and vertical deviations between the points of intersection on the two reference planes provide an indication of the orientation of the beam with respect to the apparatus.

16 Claims, 3 Drawing Sheets

APPARATUS AND METHOD FOR DETECTING THE POSITION AND ORIENTATION OF A REFERENCE BEAM OF LIGHT

BACKGROUND OF THE INVENTION

This invention relates to the detection of the position and orientation of a reference beam of light and, more particularly, to an apparatus for detecting the position and attitude of an excavation or boring machine with respect to such a beam to permit an operator to make timely corrections for any deviations in the path of the machine from its proper course.

Excavation and earth boring machines are known. These machines tunnel beneath the earth and are useful for laying large underground pipelines and for tunneling through mountains and/or beneath rivers and the like. Such machines are quite large, typically having a diameter in the range of 20 to 50 feet and a length several times that. It is necessary to control the direction of movement of an excavation machine rather precisely, however, so that the machine follows a proper, predetermined course. Once an excavation machine veers off course significantly, returning it to its desired path is somewhat difficult.

One prior system for controlling the direction of such excavation machinery involves the use of a laser beam or other beam of coherent light which is aimed along the desired machine path. A target for the beam, mounted on the rear of the machine is watched by the machine operator. If the excavation machine veers off course, this fact is indicated by the beam of light moving off of the center of the target. The operator then corrects the direction of the machine until the beam of light impinging the target indicates that the machine is back on its proper course.

The problem with this prior system is that, although it indicates when the rear end of the machine is properly positioned, most excavation machines have the boring mechanism located on the front of the machine, which is a substantial distance from the rear of the apparatus. Thus, the prior system was incapable of detecting the attitude or orientation of the excavation machine. That is, although the beam of light might indicate that the rear of the machine was directly on target, the front of the machine could be out of alignment significantly either in the vertical direction (pitch) or the horizontal direction (yaw). The task of the operator in controlling the direction of such a machine is made more difficult in that the machine is controlled from a station near its rear end where the attitude of the machine is not readily apparent to the operator. For example, if the front of the excavation machine were digging at too steep a grade, this would not be apparent until eventually the position of the beam of light on the target would alert the operator to this fact. The operator could make the necessary corrections to the course of the machine but the machine most likely would already be substantially off course. Thus the prior art system tended to cause the operator to overcorrect, leading to the need for further corresponding changes in the direction of the machine.

Accordingly, there is a need in the art for an apparatus which can measure the relative position and the relative orientation of a reference beam of light, which information can then be utilized to determine the orientation and attitude of an excavation or earth boring machine to provide improved control.

SUMMARY OF THE INVENTION

The present invention meets that need by providing an apparatus and method for detecting the position and orientation of a reference beam of light. This information, in turn, may be supplied to the operator of an excavation machine or the like to control the course and grade at which the device is digging. According to one aspect of the present invention, the apparatus includes a first detector for detecting the intersection of the reference beam of light with a first reference plane and a second detector for detecting the intersection of the reference beam of light with a second reference plane which is spaced from, and substantially parallel to, the first reference plane. The apparatus also includes means which are responsive to the information supplied by the first and second detectors for determining the orientation of the reference beam of light with respect to the first and second reference planes.

In a preferred embodiment of the invention, the first detector includes a partially reflective mirror extending in front of a first reference plane which acts to deflect a portion of the reference beam of light laterally while permitting the balance of the beam to pass therethrough. A first receptor is positioned laterally of the mirror to intercept that portion of the beam of light which has been reflected by the first mirror. The receptor may be any of a number of conventional detection devices such as, for example, an array of photocells or a split photocell device.

The apparatus also includes as the second detector a fully reflective mirror extending in front of the second reference plane so as to reflect laterally the balance of the reference beam of light. A second receptor, also located laterally of the mirror intercepts the balance of the beam of light. Preferably the mirrors are positioned so that the respective beams of light are deflected at angles of substantially 90° with respect to the initial path of the reference beam of light.

The apparatus further includes means for moving the first and second receptors in planes which are generally orthogonal to the first and second reference planes. These means may include a pair of wiper blades onto which the first and second receptors are mounted. The wiper blades are operated synchronously in tandem by an associated motor and gearing arrangement. An encoder, associated with the wiper blades and motor, provides information concerning the angle of the wiper blades with respect to the base of the device.

In operation, a beam of coherent light strikes the first mirror. Part of the beam passes through the mirror unaffected while part of the beam is reflected laterally to the first receptor mounted on the first wiper blade. The remainder of the beam passes through the first mirror and strikes the second mirror where it is laterally reflected to the second receptor mounted on the second wiper blade. The locations where the reflected light beams strike the respective receptors on the first and second respective wiper blades provide information relative to the attitude and direction of the apparatus, and of the excavation machine or the like on which it is mounted, with respect to the beam. This information permits an operator to correct the attitude and/or direction of travel of the excavating machine.

In a preferred embodiment of the invention, a general or special purpose computer is included in the apparatus and receives information from the two detectors as well as the angle encoder. The computer performs the necessary mathematical computations to provide the operator of the machine with sufficient information to correct the attitude and/or direction of travel of the machine. Optionally, the computer may provide an output to an automatic control device which corrects the attitude and/or direction of travel of the machine without the need for the intervention of an operator.

Accordingly it is an object of the present invention to provide an apparatus for detecting the position and orientation of a reference beam of light. This and other objects and advantages of the invention will become apparent from the following detailed description, the accompanying drawings, and the appended claims.

DETAILED DESCRIPTION OF THE PREFERRED EMBODIMENTS

Figure 1:
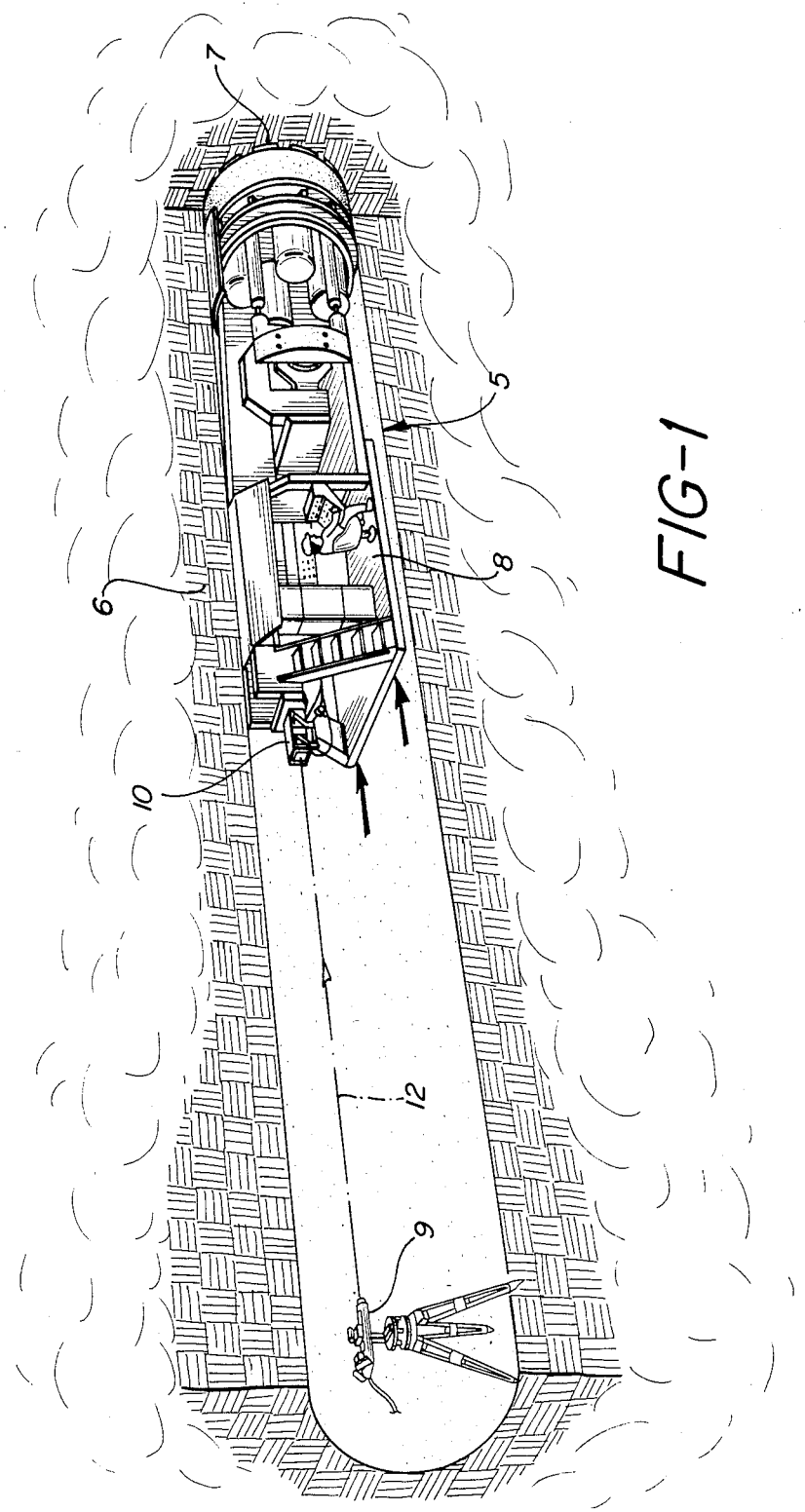
FIG. 1 is a partial sectional view showing a tunnel boring machine, laser beam projection device, and beam detector apparatus mounted on the rear of the tunnel boring machine.

FIG. 1 of the drawings illustrates a typical operating environment for the apparatus of the present invention. A tunneling machine of koown design, indicated generally at 5, tunnels through the earth 6. Such a machine includes boring and cutting mechanisms at its front end 7 which dig through the earth 6 and an earth conveyor arrangement (not shown) for conveying dirt and rocks to the rear of the machine where they may be removed by appropriate transport vehicles. As will be appreciated, since the operator's control station 8 is located to the rear of the machine and since the tunneling machine completely fills the end of the tunnel which is in the process of being excavating, it is difficult for the operator of the machine to know whether the machine is tunneling along the desired path and whether the orientation of the machine is such that the machine will continue on the desired path.

The present invention contemplates utilizing a beam from a beam projector 9, which may preferably be a modulated laser beam, to provide a reference line extending along the desired path of the tunnel. Amplitude modulation of the beam may be utilized to insure that light from other ambient sources is not mistaken for the reference beam. A detection device 10 is mounted on the rear of the tunneling machine 5 for detecting the relative position of the machine 5 with respect to the beam 12. As will be more fully explained, the present invention provides an indication to the operator as to the position of the rear end of the machine 5 with respect to the desired path. Of course, even if the rear end of the machine 5 is properly positioned, the front end of the machine may be pitched up or down, or skewed to one side so that the machine will shortly leave the desired path. The present invention also provides an indication to the operator as to the orientation of the machine 5 and the amount of any pitch or yaw.

Figure 2:
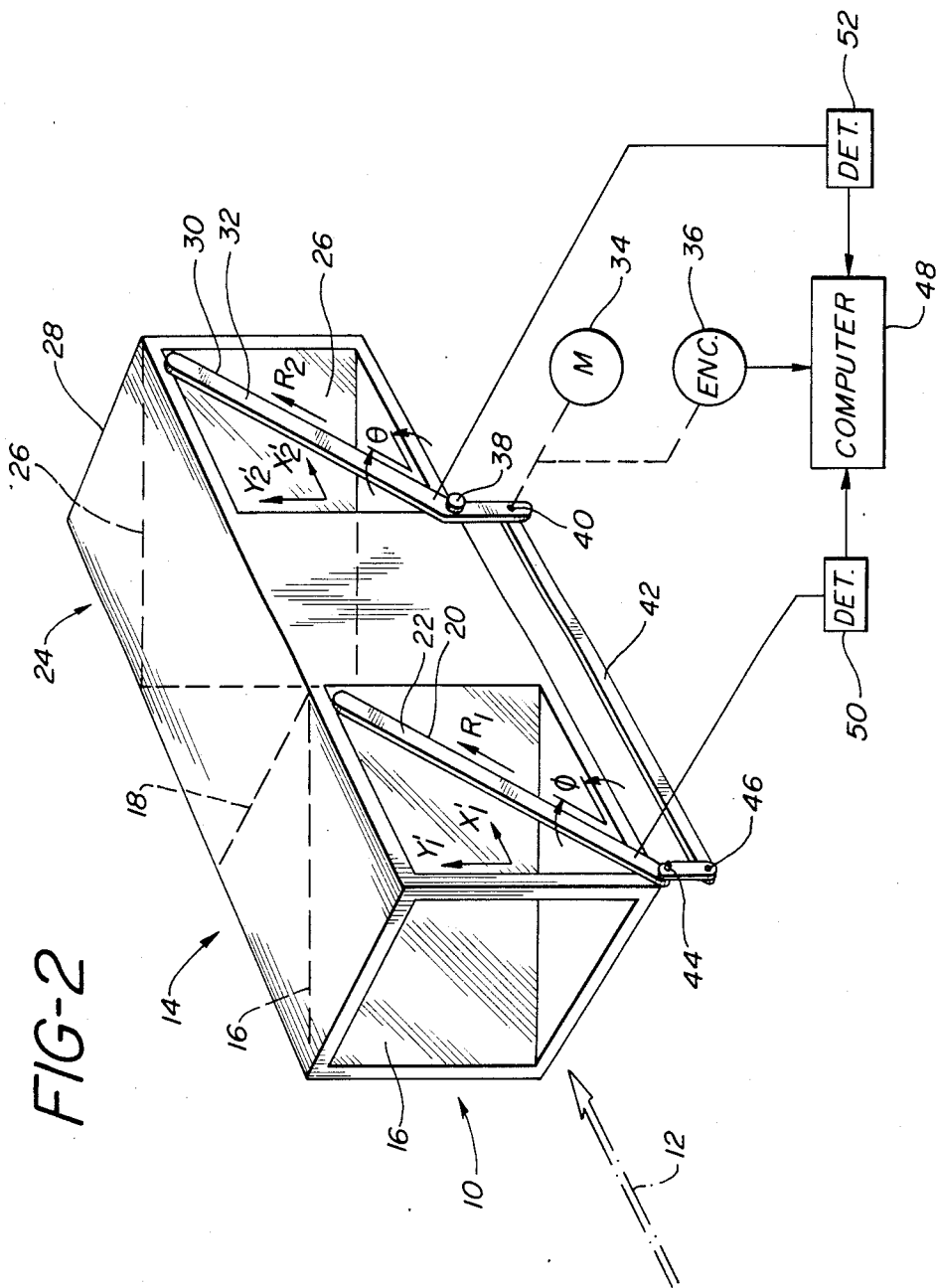
FIG. 2 is a schematic drawing of the apparatus of the beam detector apparatus of present invention, shown in perspective.
Figure 3:
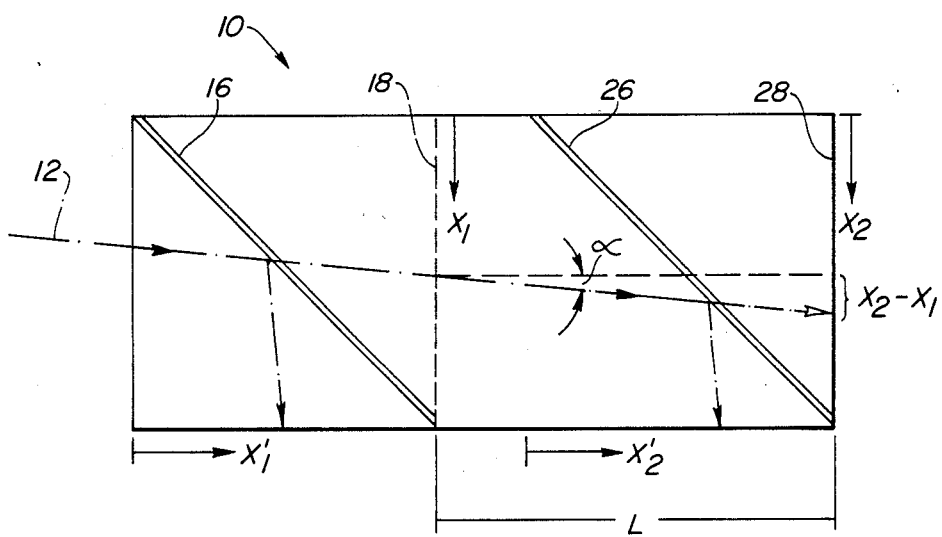
FIG. 3 is a top schematic view of the apparatus of the present invention, illustrating the manner in which the position and orientation of the reference beam of light is detected and measured.

Referring now to FIGS. 2 and 3, detection device 10 is oriented to receive the reference beam of light 12. Device 10 has a first detector 14 which includes a partially reflective mirror 16 extending in front of a first reference plane 18. Preferably, partially reflective mirror 16 is a half-silvered mirror which deflects fifty percent of the reference beam light laterally while permitting the balance of the beam to pass therethrough. A first receptor 20 is positioned laterally of the mirror and generally orthogonal to first reference plane 18 to intercept that portion of the beam of light which has been reflected by partially reflective mirror 16. As shown, mirror 16 is preferably arranged at an angle of 45° with respect to the longitudinal axis of the device so that the light which it reflects is deflected at an angle of approximately 90° from the angle of incoming reference beam of light 12.

First receptor 20 is mounted on the side of wiper blade 22 facing mirror 16 to detect the reflected beam of light. Preferably, first receptor 20 may be a split photocell device such as the device disclosed in commonly assigned copending U.S. Application Ser. No. 762,518 filed August 5, 1985 for DETECTOR DEVICE FOR A ROTATING LIGHT BEAM. Alternatively, first receptor 20 may comprise an array of photocells positioned along the length of first wiper blade 22. Both the array of photocells and the split photocell device are capable of providing an indication of the point along the length of the wiper blade 22 which is struck by the beam of light. That distance is shown as $R_1$ in FIG. 1.

Device 10 also includes a second detector 24 which includes a fully reflective mirror 26 positioned in front of a second reference plane 28. Preferably, mirror 26 is a fully silvered mirror which is positioned at an angle of 45° with respect to the longitudinal axis of the device so that the reference beam of light is deflected laterally at an angle of approximately 90°. A second receptor 30, located on the side of wiper blade 32 facing mirror 26, detects the position of the reflected beam of light. Like first receptor 20, second receptor 30 may be either an array of photocells along the length of wiper blade 32 or may comprise a split photocell. The distance along wiper blade 32 at which the beam of light impinges is shown as $R_2$ in FIG. 1.

A motor 34 operates wiper blades 22 and 32 synchronously in tandem through a drive shaft (not shown) which causes bracket 42 to reciprocate. Wiper blades 22 and 32 are pivotally connected to bracket 42 through pins, 38, 40, 44 and 46, respectively, and this caused to sweep back and forth such that the blades each intercept the reflected beams of light. An encoder 36, associated with wiper blades 22 and 32 and motor 34, provides computer 48 with information concerning the respective angles $\phi$ and $\theta$ of the wiper blades, as shown in FIG. 1, at the times that reflected beams are intercepted.

Computer 48 may be a special or general purpose digital computer which receives information from angle encoder 36, as well as detector circuits 50 and 52. Detector circuits 50 and 52 provide information concerning the points on wiper blades 22 and 32 at which the deflected beams of light impinge. Thus, for purposes of illustration, it may be assumed that the beam of light reflected from partially reflective mirror 16 impinges wiper blade 22 at a distance $R_1$ from the base of the blade. Likewise, the remainder of the beam of light which is reflected from fully reflective mirror 26 impinges wiper blade 32 at a distance $R_2$ from the base of that wiper blade. Encoder 36 provides computer 48 with information concerning the respective angles $\phi$ and $\theta$ illustrated in FIG. 1, at which the wiper blades 22 and 32 respectively are positioned when detecting the beam 12.

Computer 48 solves several trigonometric relationships, and determines the position and orientation of the device with respect to the reference beam of light 12. As shown in FIG. 2, the left to right deviation of reference beam 12 can be defined in terms of a yaw angle α. Yaw angle α is defined by formula 1 below as:

$$\text{yaw } \alpha = \tan^{-1}\left(\frac{X_2 - X_1}{L}\right), \quad (1)$$

where $X_1$ is the horizontal distance along reference plane 18 where reference beam 12 would impinge, $X_2$ is the horizontal distance along reference plane 28 where reference beam 12 would impinge, and L is the distance between reference planes 18 and 28, a known fixed distance.

Similarly, the vertical deviation of reference beam of light 12 can be defined by a pitch angle β which is defined mathematically in formula 2 below.

$$\text{pitch } \beta = \tan^{-1}\left(\frac{Y_2 - Y_1}{L}\right), \quad (2)$$

where $Y_1$ is the vertical distance along reference plane 18 where reference beam 12 would impinge, $Y_2$ is the vertical distance along reference plane 28 where reference beam 12 would impinge, and L is the distance between reference planes 18 and 28.

For the situation as illustrated in FIGS. 1 and 2 where mirrors 16 and 26 are positioned at 45° angles respectively, to reference planes 18 and 28, the horizontal distances $X_1$ and $X_2$ and the vertical distances $Y_1$ and $Y_2$ are related to the distances $R_1$ and $R_2$ on wiper blades 22 and 32 and their respective inclusive angles φ and θ as follows:

$$X_1 = X_1' = R_1 \cos \phi.$$

$$Y_1 = Y_1' = R_1 \sin \phi.$$

$$X_2 = X_2' = R_2 \cos \theta$$

$$Y_2 = Y_2' R_2 \sin \theta$$

The values $X_2$ and $Y_1$ are of direct significance since they provide an indication of the location of the rear end of machine 5 with respect to beam 12 and the desired path for the machine. Determination of the yaw and pitch of the machine 5 requires calculations based upon the measured values.

Substituting the above relationships into formulas 1 and 2, the yaw angle α and pitch angle β are represented as follows:

$$\text{yaw } \alpha = \tan^{-1}\frac{R_2\cos \theta - R_1\cos \phi}{L} \quad (3)$$

$$\text{pitch } \beta = \tan^{-1}\frac{R_2\sin \theta - R_1\sin \phi}{L} \quad (4)$$

Computer 48 is provided with the angles θ and φ as well as the distances $R_1$ and $R_2$, and distance L between reference planes 18 and 28 is stored in memory. The computer 48 readily calculates both the yaw and pitch angles, respectively, and provides the operator of the device with an indication of the deviation of the device from the proper attitude and direction. This information can then be used to correct any deviations from the predetermined course. Optionally, computer 48 may also be programmed to provide automatic correction of the attitude and direction of travel without the need for the intervention of an operator.

The device of the present invention is well suited for installation in large excavation and boring machines and the like where there is a need for controlling the direction and attitude of such machinery while in operation. The device of the present invention may also find use on any other apparatus which can utilize a reference beam of light to control attitude and direction.

Having described the invention in detail and by reference to preferred embodiments thereof, it will be apparent that modifications and variations are possible without departing from the scope of the invention defined in the appended claims.

What is claimed is:

1. Apparatus mountable on a machine, such as a tunnel boring machine, for detecting the position and orientation of the machine with respect to a reference beam of light, comprising:
   first means for detecting the intersection of said beam with a first reference plane,
   second means for detecting the intersection of said beam with a second reference plane, said second reference plane being spaced from and substantially parallel to said first reference plane, and
   means, responsive to said first and second detector means, for determining the orientation of said beam with respect to said first and second reference planes.

2. The apparatus of claim 1 in which said first detector means includes:
   a partially reflective mirror extending in front of said first reference plane so as to deflect a portion of said beam laterally while permitting the balance of said beam to pass therethrough, and
   a first receptor for intercepting said portion of said beam deflected by said partially reflective mirror.

3. The apparatus of claim 2 in which said second detector means includes:
   a fully reflective mirror extending in front of said second reference plane so as to deflect laterally said balance of said beam, received from said first detector means, and
   a second receptor for intercepting said balance of said beam deflected by said fully reflective mirror.

4. The apparatus of claim 3 in which said first and second receptors each comprise a diagonally split photocell.

5. The apparatus of claim 4 in which said partially reflective mirror and said fully reflective mirror are each aligned to deflect said light beam laterally with respect to the initial path of said beam, and further comprising means for moving said first and second receptors in planes generally orthogonal to said first and second reference planes, respectively.

6. Apparatus for tunneling through the earth in a precisely controlled path, comprising:
   projection means for providing a reference beam of light directed generally along said precisely controlled path;
   earthmoving means for tunneling through the earth;
   detector means, mounted on said earthmoving means, for detecting the position and orientation of said reference beam of light with respect to said earth-moving means, said detector means having first means for detecting the intersection of said reference beam with a first reference plane and second means for detecting the intersection of said reference beam with a second reference plane, said second reference plane being spaced from and substantially parallel to said first reference plane; and means responsive to said first and second detector means for determining the orientation of said reference beam with respect to said first and second reference planes.

7. The apparatus of claim 6 in which said detector means is mounted adjacent the rear end of said earth-moving means.

8. The apparatus of claim 6 in which said first detector means comprises:
a partially reflective mirror extending in front of said first reference plane so as to deflect a portion of said beam laterally while permitting the balance of said beam to pass therethrough, and
a first receptor for intercepting said portion of said beam deflected by said partially reflective mirror.

9. The apparatus of claim 8 in which said second detector means comprises:
a fully reflective mirror extending in front of said second reference plane so as to deflect laterally said balance of said beam, received from said first detector means, and
a second receptor for intercepting said balance of said beam deflected by said fully reflective mirror.

10. The apparatus of claim 6 in which said first and second receptors each comprise a diagonally split photocell.

11. The apparatus of claim 10 in which said partially reflective mirror and said fully reflective mirror are each aligned to deflect said light beam laterally with respect to the initial path of said beam, and further comprising means for moving said first and second receptors in planes generally orthogonal to said first and second reference planes, respectively.

12. A method of detecting the relative position and orientation of apparatus with respect to a reference beam of light, comprising the steps of:
detecting the point of intersection of the reference beam with a first reference plane defined by the apparatus,
detecting the point of intersection of the reference beam with a second reference plane defined by the apparatus, said second reference plane being substantially parallel to and spaced from said first reference plane, and
determining the deviation between said beam and a reference line extending substantially perpendicular to said first and second reference planes.

13. The method of claim 12 in which said step of determining the deviation includes the step of determining a pitch angle $\beta$ for said reference beam of light.

14. The method of claim 13, in which the pitch angle is determined by $$\text{pitch } \beta = \tan^{-1}\left(\frac{Y_2 - Y_1}{L}\right), \quad (2)$$

where $Y_1$ is the vertical coordinate of said point of intersection with said first plane, $Y_2$ is the vertical coordinate of said point of intersection with said second plane, and L is the distance between said first and second reference planes.

15. The method of claim 12 in which said step of determining the deviation includes the step of determining the deviation includes the step of determining a yaw angle $\alpha$ for said reference beam of light.

16. The method of claim 15 in which the yaw angle is determined by $$\text{yaw } \alpha = \tan^{-1}\left(\frac{X_2 - X_1}{L}\right), \quad (1)$$

where $X_1$ is the horizontal coordinate of said point of intersection with said first plane, $X_2$ is the horizontal coordinate of said point of intersection with said second plane, and L is the distance between said first and second reference planes.

* * * * *

UNITED STATES PATENT AND TRADEMARK OFFICE
CERTIFICATE OF CORRECTION

PATENT NO. : 4,786,178

DATED : November 22, 1988

INVENTOR(S) : Ted L. Teach

It is certified that error appears in the above-identified patent and that said Letters Patent is hereby corrected as shown below:

Col. 3, line 32 "koown should be --known--.
Col. 3, line 67 "Iight" should be --light--.
Col. 5, line 45 "$Y_2'R_2$" should be --$Y_2'=R_2$--.

Signed and Sealed this

Eighteenth Day of April, 1989

Attest:

DONALD J. QUIGG

Attesting Officer      Commissioner of Patents and Trademarks